July 16, 1963  C. M. HARKINS  3,097,682
TIRE FILLER VALVE
Filed June 1, 1960
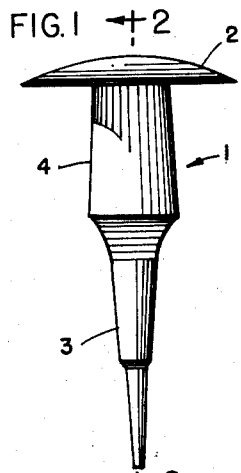
FIG. 1
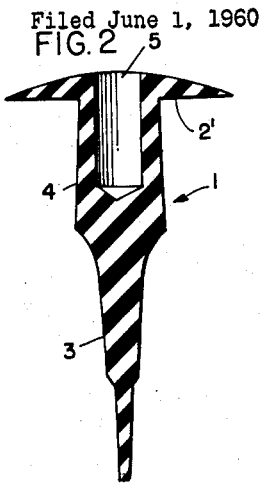
FIG. 2
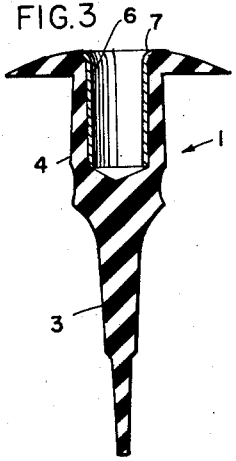
FIG. 3
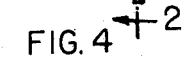
FIG. 4
FIG. 5
FIG. 6
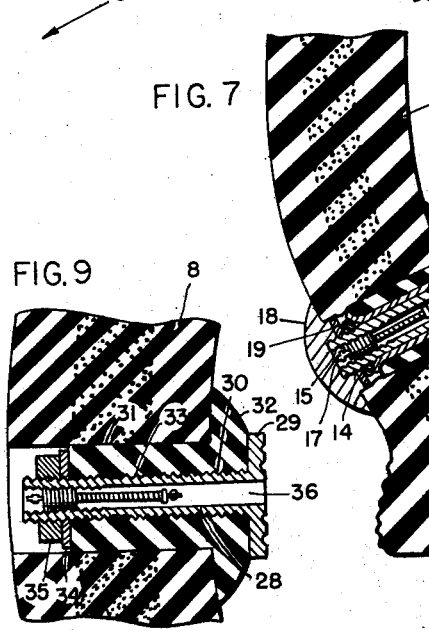
FIG. 7
FIG. 9
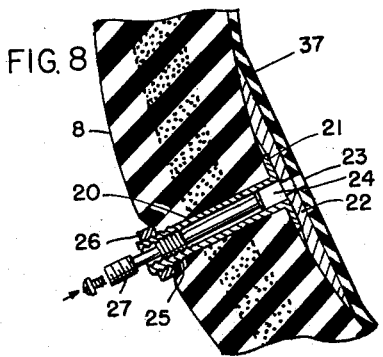
FIG. 8
INVENTOR:
CARLYLE M. HARKINS
BY
ATT'Y

United States Patent Office 3,097,682
Patented July 16, 1963

3,097,682
TIRE FILLER VALVE
Carlyle M. Harkins, 2134 N. Hampton Court, Peoria, Ill.
Filed June 1, 1960, Ser. No. 33,294
5 Claims. (Cl. 152—429)

This invention relates generally to a filler valve for pneumatic tires and more particularly for filler valves adapted to pass through a side wall of a large heavy duty pneumatic tire.

During the early development of the use of pneumatic tires for automobiles and wheeled vehicles, it was a common practice of industry to vulcanize the valve stem or filler valve to an inflatable inner tube and then place the combination of tube and valve stem within a tire casing, passing the uppermost portion of the stem through an opening in a wheel rim. As is well realized by those who have attempted to change a tire of a construction having an inner tube with a valve stem attached thereto, it provides a problem in aligning an inner tube with an opening in a wheel rim and maintaining such so that a valve stem protrudes in center alignment in the opening as a tire casing is installed and inflated on the wheel rim.

In recent years, the tire industry has introduced what is known as a tubeless tire. The use of a tubeless tire eliminated the problem of having an inflatable tube within a tire casing and also much of the problem of aligning of a valve stem through a particular opening, but the valve stem has now been mounted on the rim where two problems further present themselves. Access is difficult if the stem is short enough not to be broken, or damage occurs to the stem if long enough to provide ease of access. Furthermore, with heavy work tires, the stem is covered with mud or dirt and is hard to locate if additional air pressure is required. The tubeless tire did help with stem creep which occurred with under inflated tube tires, but most of the problems with tube valve stems remained with tubeless tires plus a new one of quick inflation to seal the rim and tire at the tire beads.

Not only were the above problems confronting the heavy tire industry, but problems also existed for light tires in the automobile industry. The designers of the modernistic streamlined car of today continue to design hub caps with an unsightly hole, but the valve stems continue to protrude. The replacement of a common protruding valve stem with a smooth flush mounted side wall type valve of the invention will not only eliminate the above problems but will also provide the automotive engineer with a greater area for clean design under the hub cap but enables the design of a brake drum of greater diameter within the rim of the wheel itself. Conversely, for a given brake size, a smaller diameter rim and tire can be made, reference hereby being made to my application Serial No. 4,376 filed January 25, 1960, for further advantages with a wide rim enabled hereby.

Another problem, remedied by the present invention is found with a protruding rubber valve stem for pneumatic tires, on dual tire wheels. Because of a valve stem being placed on only one side of a tire, it is quite obvious the difficulty that is encountered in locating a valve stem on an inner tire of the dual wheels for inflation. This also presents a problem of limiting the number of positions for rotating the tires on the vehicles as where tire and rims are completely removed and placing on different wheels of the vehicle, to provide even wear of the treads. The filler valves or protruding valve stems must always be on the outside surface or face of the wheel for ease of filling and where such are on the inside checking tire pressure is most difficult and inaccessible.

It is therefore a primary object of this invention to eliminate the related problems of the prior art and to provide an improved and useful valve stem which passes through and is flush mounted in a side wall of a tire without weakening the tire wall.

The specific object of this invention is to provide an improved filler valve for pneumatic tires that can be easily installed in a side wall of existing tires both heavy duty and passenger tires.

A further object of this invention is to provide an improved composite valve stem which is simple in construction, economical to fabricate, durable, and corrosive resistant, permitting the tire to be used with any type or width of rim construction and hub cap design.

A further object of this invention is to provide a method for installing a side wall filler valve in a pneumatic tire which can be tubeless or utilize an inner tube, the inner tube forming a part of the tire if desired.

Another object of this invention is to provide a method for installing a side wall filler valve in a tubeless tire.

A still further object of this invention is to provide an improved filler valve that can be secured in a side wall of a pneumatic tire without reducing the resilient strength of the side wall material, yet is in a position where it is kept clean by the action of the tire.

A still further object of this invention is to provide an improved filler valve structure which can be easily secured to a side wall of a pneumatic tire both tube and tubeless which can supplement or be auxiliary to other means of inflating a tire.

A still further object of this invention is to provide an improved filler valve which is capable of being adjustably secured for any thickness of a tire side wall.

Another object of this invention is to provide an improved and useful filler valve adapted to be mounted in a side wall of a pneumatic tire which provides a resilient gripping seal member flush with the external surface of a pneumatic tire side wall.

With the foregoing and other objects in view the invention resides in the following specification and appended claims, certain embodiments and details of construction of which are illustrated in the accompanying drawings, in which:

FIG. 1 is a view in side elevation showing a tapered rubber plug which provides a housing for this invention;

FIG. 2 is a sectional view taken along a line 2—2 of FIG. 1 showing a center opening removed;

FIG. 3 is a cross-sectional view taken along a line 2—2 of FIG. 1 illustrating a metal insert in the central opening;

FIG. 4 is a fragmentary exploded cross-sectional view of a tire wall illustrating an opening for this invention;

FIG. 5 is a fragmentary exploded cross-sectional view illustrating a tapered rubber plug with a metal insert of FIG. 3 passing through an opening in a tire wall;

FIG. 6 is a fragmentary exploded cross-sectional view illustrating the removal of the lower tapered portion of a rubber plug shown in FIG. 5;

FIG. 7 is a fragmentary exploded sectional view illustrating a preferred embodiment of this invention providing a valve member installed within a rubber plug and a flush mounted protective sealing means applied;

FIG. 8 is a fragmentary exploded sectional view illustrating another embodiment of this invention wherein a filler valve is used in conjunction with an inner tube; and FIG. 9 is a fragmentary exploded cross-sectional view showing another embodiment of this invention.

Referring now particularly to the drawings, a tapered rubber plug, indicated generally by a number 1, has an upper flange member 2 and a lower tapered tip portion 3 with a body portion 4 approximately cylindrical or slightly tapered as shown in FIG. 1. The plug 1 may be of any suitable soft vulcanized elastomer material and the physical dimensions of the plug will vary depending upon the side and wall thickness of the pneumatic tire for which it is to be used, its minimal size being limited by the valve mechanism which is to be installed therein. The tapered plug 1, as illustrated in FIG. 1, is in use in the tire industry today for sealing minute leaks in tubeless tires.

Referring now specifically to FIGS. 2 and 3, the rubber plug 1 is hollow as at 5. This recess 5 in the upper portion of plug 1 is concentric with the outside contour of the body portion 4. A sleeve insert 6 preferably of a non-ferrous ductile metal is positioned in the recessed opening 5. The insert 6 is usually made of brass due to its ability to withstand corrosion and because of its formability and its ability to form a strong bond with a rubber material. Other non-corrosive metals are acceptable and are used depending upon the locale for which they may be expected to operate if such is known. The metallic insert 6 has an outside diameter larger than the inside diameter of the recess 5. Thus, it is seen that the resilient rubber-like material of plug 1 will expand and grip the outer surface of the insert 6. An upper end of the insert 6 is flared in an outward direction as illustrated at 7. This flared portion 7 not only serves as a stop means upon insertion of the insert into the recess 5, but also serves as a stop and seal flange for operations which will be explained later.

Referring now specifically to FIG. 4, a pneumatic tire 8 has an opening 9 disposed therein. The opening 9 is positioned just slightly above the beads of the tire casing 8 as is shown in FIG. 7. The advantage of having the opening 9 in this position will be explained later. Opening 9 may be made in a side wall 8' of the pneumatic tire 8 in any suitable manner. It can be molded in the tire originally or pierced after vulcanization. The primary problem or caution is to not weaken the cords 8a or disrupt the strength of the side wall, thereby reducing the resilient strength of the over-all tire.

The diameter of the opening 9 will vary according to the size of the plug 1 that is to be used. Dimensionally, the inside diameter of the opening 9 will be about half way between the outside diameter of the body portion 4 of the rubber plug 1 and the diameter of the sleeve 6. It will be seen that due to the dimensional difference, as the plug 1 is pulled or forced into the opening 9 in the side wall 8' by pulling on the tip portion 3 after insertion thereof through the opening, the resilient side wall 8' will stretch and thin out to ease the plug into place. Thereafter upon release the resiliency of the plug will form a positive pressure seal. By pulling on the lower tapered tip 3 the plug 1 is drawn into the opening 9 until the bottom surface 2' of the upper flange member 2 engages the inner face of the tire side wall 8'. Thereafter, when the tip portion is released the resiliency of the side walls of the plug wanting to enlarge continues to draw the flange 2 against the inner face of the tire and the sidewall 8 will have a tendency to pinch or squeeze the rubber plug in an area portion where the metal insert 6 extends.

Upon insertion of the plug 1, having the metal insert 6 installed therein, into the opening 9 of the side wall of the pneumatic tire 8, a bonding agent or securing material may be placed on the bottom surface 2' of the upper flange 2 so that when the plug is pulled or forced completely through the opening 9, the flange 2 will bond to the inner surface of the side wall 8'. The flange 2 may also be secured to the inner surface of the side wall 8' by means of a liquid adhesive initially lubricating insertion and filling all the rough portions of the opening 5. Vulcanizing can also be used but it is not entirely necessary.

Referring now specifically to FIG. 6, the tapered tip portion 3 of the rubber plug 1 is removed from the cylindrical body portion 4 at about the end of the sleeve 6. After removal of the tapered tip 3, the metal insert 6 has its protruding or outer edge portion 10 flared in an outward direction to engage the outer portion of the cylindrical body 4 and the wall of the opening 5 in the side walls 8' of the pneumatic tire 8. Thus, a metallic opening through the side wall of the pneumatic tire is provided which will not move in either direction due to the flared portions on both ends and the gripping action of the plug 1 which is bonded or sealed to the inner portion of the side wall of the tire and gripped by the expansion-compression action of the elements engaged.

Referring now to FIG. 7, a cylindrical metallic valve housing 11 is concentrically mounted within the metallic insert 6. One end of the valve housing 11 flares outwardly into a flange 12 formed at right angles to the center line of the housing. As the housing is inserted from inside the tire an O-ring 13 of an elastomer material is positioned on the shank and is compressed against the flared portion 7 of the insert 6 to provide a positive non-leaking seal between the valve housing 11 and the metallic insert 6.

The other end of the valve housing 11 has an external threaded portion 14 which extends outwardly from the flared end 10 of the metallic insert. The valve housing 11 is both internally and externally threaded 14 at its outer end and preferably terminates within the outside wall of the tire. The external thread receives a clamp nut 19 to hold the sleeve in place and the internal thread at 15 which is concentric with the opening 16 passing through the length of the valve housing 11, has a conventional spring operated valve threaded therein sometimes referred to as a Dill valve or tire valve. The valve housing 11 and the spring operated valve member are made of a suitable non-corrosive material for the same reasons given relative to the metallic insert 6.

A resilient sealing member 18, having a rounded contour as illustrated in FIG. 7, is axially pressed or threaded onto the external threaded portion 14 of the valve housing 11. A sealing O-ring may be disposed around the valve housing 10 between the flared portion 10 of the metallic insert 6 and the nut 19 if a seal is desired at this point.

As is readily seen in FIG. 7, the sealing member 18 provides a flush smooth outer surface and prevents any contamination of the valve, same being removably secured by the threaded portion 14 and the resilient compressive gripping action of the side wall 8'.

The filler valve is placed in the side wall at a position near the bead as illustrated in FIG. 7 for the purpose of providing not only ease of inflation and to enhance the beauty of the tire, but it is seen that this area has the least amount of flexing as the tire rolls upon the ground. The object of having the least amount of flexing is advantageous as it assures a constant positive gripping action by the side wall 8' upon the body portion 4 of the plug member 1 at all times yet the small amount of flexing which does occur keeps dirt from collecting on the member 18.

Referring now to FIG. 8, another embodiment of the invention illustrates a single insert such as a metallic cylindrical housing member 20 having a flared flange element 21 extending outwardly at right angles to the center line of the cylindrical housing. A resilient rubber flange member 22 is secured to the remote surface of the flange 21 and has a central opening 23 to correspond with a concentric opening 24 which passes through the valve housing 20. As the metallic valve housing 20 is pressed through the opening in the side wall 8', similar to the opening 9 described above, the under surface of the metallic flat washer 21 and the under surface of the flange member 22 are coated with a bonding agent or adhesive material. The action of the bonding agent provides a complete seal for the open passage 23–24 through the valve housing and the flange member. The opening in the sidewall 8' of the pneumatic tire 8 being smaller in diameter than the outside diameter of the metallic housing 20 as for passenger tire applications, a positive sealing grip is effected due to the compressive action of the side wall 8'.

The valve housing 20, having a protruding externally threaded portion 25, is secured to the side wall 8' not only by the compressive action of the side wall 8', but also by a holding nut 26 which threadably engages the threaded portion 25. The holding nut 26 engages the surface of the side wall 8' as it is turned in a clockwise direction and beds itself into the rubber. The concentric opening 24 of the valve housing 20 is partially threaded by which the spring operated valve mechanism 27 is secured deeply therein.

This embodiment of the invention is particularly advantageous in use with pneumatic tires requiring an inner tube. As is readily seen in FIG. 8, an inner tube 37 is bonded, by means as vulcanizing or a bonding agent, to the outer surface of the rubber flange member 22. Once the tube is securely held to the flange 22, all that is required to inflate the tube is to pass a pointed instrument through the valve housing opening and perforate the tube. Once the perforation of the tube is made, the application of air pressure to the valve housing assembly will inflate the tire. Not only will the bonding material or the vulcanizing action perform a leak-proof seal around the opening in the flange member 22 with the inner tube, but the action of the increasing air pressure in the tire will also force the inner tube against the surface of the flange 22, thus assuring a positive seal. A flush type sealing member, similar to 18 described above, engages the external threaded portion of the valve housing 20 to prevent contamination of the moving parts of the valve structure.

Referring now specifically to FIG. 9, another embodiment of the invention is illustrated wherein a cylindrical valve housing 28 has a flared flat washer 29 extending outwardly at one end at right angles to the center line of the cylindrical housing. The outside surface 30 of the valve housing 28 is threaded over its entire length. A resilient rubber plug member 31 has a flange portion 32. A central opening 33 passes through the entire length of the plug 31. The diameter of the central opening 33, being much less than the outside diameter of the threaded portion of the valve housing 28, provides a positive gripping seal when the valve housing 28 is forced through the central opening 33. As is readily seen in FIG. 9, the threaded valve housing 28 extends beyond the end of the rubber plug 31. The rubber plug 31, having an outside diameter about the same as the internal diameter of the opening passing through the side wall 8' is compressed by the nut 35 and washer 34 assembly to positively grip and seal under compressive action the side wall material of the pneumatic tire 8. The rubber plug 31 and the valve housing 28 is of sufficient length to pass substantially through the side wall 8', but does not protrude beyond the surface of the side wall. The force of the locking nut and the washer provides a twofold purpose. First, it secures the valve housing in the rubber plug 31 and also provides, as already mentioned, an expansion of the cylindrical body portion of the rubber plug 31 thus forcing it outwardly against the compressive action of the side wall 8' with or without an adhesive being present. The valve housing 28 has a concentric central opening 36 which is partially threaded to receive a suitable valve mechanism therein. It is therefore apparent, the only means for air to enter the pneumatic tire is through the valve mechanism.

It will be readily apparent to those skilled in the art that the present invention provides an improved and useful filler valve to be installed in the side walls of pneumatic tires, and is adaptable for use on all sizes of pneumatic tires. It is also quite obvious that the invention, as presented in the several embodiments, permits installation of a flush mounted filler valve on both sides of the tire casing to provide ease of inflation when the tires are mounted in pairs and to provide maximum interchangeability for any position on the vehicle. The invention may be subject to numerous modifications well within the purview of the inventor who only intends to be limited to a liberal interpretation of the specification and the appended claims.

What is claimed is:

1. In combination a tubeless pneumatic tire having a passage through a side wall thereof and a filler valve received therein comprising, a metallic valve housing including internal and external ends, a valve mechanism secured within the housing, a flat washer integrally formed on the internal end of the valve housing, a metallic insert including flared internal and external ends, a first sealing means disposed about the valve housing between the flared internal end of the insert and the flat washer as the valve housing is positioned within the insert, a resilient plug secured about the insert, a resilient flange formed integrally on one end of the plug, said flange extending outwardly adjacent to the flat washer, a second sealing means disposed about the external end of the valve housing, said external end extending outwardly from the plug, and a sealing member threadably engaging the external end of the valve housing to compress the second sealing means between the flared external end of the insert and the sealing member, said sealing member contoured to mount flush with the surface of the side wall in the sealing position to prevent contamination of the filler valve.

2. The invention as set forth in claim 1 wherein said first sealing means provides a leakproof seal between the valve housing and the valve insert when in a compressed condition.

3. The invention as set forth in claim 1 wherein said second sealing means provide a leakproof seal between the valve housing and the valve when in a compressed condition.

4. The invention as set forth in claim 1 wherein said resilient flange is bonded to the internal surface of the side wall.

5. A valve for a tubeless tire having an opening through a side wall, said valve comprising a resilient plug having a body portion receivable in said opening under compression and a flange at its inner end for engaging the inside wall of said tire in sealed relationship about said opening, said body portion having a length less than the thickness of said tire wall, a metal sleeve through said plug including flange means securing said sleeve in said plug against displacement, a valve housing extending outwardly through said sleeve at its outer end and having a flange at its inner end, a filler valve in said housing, a resilient sealing element between said housing flange and said sleeve, securement means on said outer end and disposed within the confines of said opening for securing the valve housing in said sleeve, sealing means between said sleeve and said securement means, and means removably engaging said outer end of the valve housing to prevent contamination of the filler valve.

References Cited in the file of this patent
UNITED STATES PATENTS

| | | |
|---|---|---|
| 2,230,879 | Bronson | Feb. 4, 1941 |
| 2,329,346 | Goff | Sept. 14, 1943 |
| 2,778,374 | Boyer | Jan. 22, 1957 |
| 2,908,313 | Pfeiffer | Oct. 13, 1959 |
| 2,933,119 | Siedow | Apr. 19, 1960 |
| 2,971,526 | Boyer et al. | Feb. 14, 1961 |